United States Patent
Etayo Garralda et al.

(10) Patent No.: US 7,534,422 B2
(45) Date of Patent: May 19, 2009

(54) UNIVERSAL FISHING BAIT BASED ON FIBROUS COLLAGEN AND THE PROCEDURE FOR ITS PREPARATION

(75) Inventors: Vicente Etayo Garralda, Pamplona (ES); Ion Inaki Garcia Martinez, Pamplona (ES)

(73) Assignee: Viscofan, S.A., Pamplona (ES)

( * ) Notice: Subject to any disclaimer, the term of this patent is extended or adjusted under 35 U.S.C. 154(b) by 734 days.

(21) Appl. No.: 10/888,377

(22) Filed: Jul. 9, 2004

(65) Prior Publication Data

US 2006/0008445 A1    Jan. 12, 2006

(51) Int. Cl.
*A01N 25/00* (2006.01)

(52) U.S. Cl. .......................... 424/84; 424/400; 530/840

(58) Field of Classification Search .................. None
See application file for complete search history.

(56) References Cited

U.S. PATENT DOCUMENTS

| 3,851,082 | A  | * | 11/1974 | Whitmore | 426/574 |
| 4,375,481 | A  | * | 3/1983  | Kuwabara et al. | 426/93 |
| 2003/0059463 | A1 | * | 3/2003 | Lahtinen | 424/450 |
| 2005/0136112 | A1 | * | 6/2005 | Gonzales et al. | 424/473 |

* cited by examiner

*Primary Examiner*—Neil Levy
(74) *Attorney, Agent, or Firm*—Notaro & Michalos P.C.

(57) ABSTRACT

The current invention involves a universal fishing bait fundamentally comprised of a matrix of fibrous collagen made up into any shape or design capable of attracting fish, that is 100% biodegradable and innocuous, that has physico-chemical properties that confer it with the capacity to accommodate liberate and diffuse attractant substances, and whose physico-mechanical properties confer it a soft and flexible texture, as well as making it resistant to breakage. Likewise, the invention outlines a procedure to prepare such a bait, and a precursor paste employed in the preparation, as well as the use of fibrous collagen in the preparation of said universal fishing bait.

23 Claims, 2 Drawing Sheets

UNIVERSAL FISHING BAIT BASED ON FIBROUS COLLAGEN AND THE PROCEDURE FOR ITS PREPARATION

FIELD OF THE INVENTION

The present invention belongs to the field of the fishing baits used in diverse forms of fishing, principally those of to sports fishing, both marine and freshwater. More particularly, it refers to artificial fishing baits that are 100% biodegradable, made from collagen, and that imitate the form of the usual prey of the fish, their organoleptic qualities and their movements. Moreover, the baits present optimal mechanical properties and are easily manipulated, transported and stored.

BACKGROUND TO THE INVENTION

Diverse forms of fishing, principally those dedicated to sports fishing, both marine and freshwater, use a wide variety of lures with hooks, whose form or characteristics are aimed at attracting the attention of the fish and other prey. Many of these baits try to imitate not only the form of the habitual prey of the fish but also their organoleptic qualities and even their movements. To achieve this, the angler provokes the movement of the lure, either by casting it through the air and rapidly retrieving the line to which it remains attached in the water in an active manner, using a fishing reel for example; or by dragging the lure in the water using the traction of an aquatic vehicle that tows the line, a form of fishing known as trolling lure fishing; or a combination of both. In both cases, but to a greater extent in the trolling lure style, the dragging of the lure creates a great amount of friction between the bait and the water, which augments with the speed, such that the bait must be reasonably resistant to the traction so as not to disintegrate. In other cases, such as the "surf casting" fishing, the bait is attached to a weighted hook and the apparatus is cast from the rod from a fixed position on land. Once the bait has reached the bed, the lure will only undergo limited movements, at the mercy of the currents or the waves and it will act on its own to attract the fish.

In some cases, the lure is composed of elements made from rigid materials that may or may not include articulations, with a certain capacity to navigate below the water. This capacity to navigate is based on the dynamics of the forces produced by the counter-currents that are generated in the water by the dragging of the lure, which creates a motion of such lures that can be rotary ("spinning"), snaking, wavy, vibrant or erratic, and that can even provoke the production of a sound or buzzing ("buzz-baits"). These elements can be endowed with reflective or coloured, and even fluorescent, surfaces that draw the fish's attention to them more readily increasing their attractive effect.

In other cases, as in the case of the most extended form of sea sports fishing, the lures are composed of flexible elements, that are made of soft and/or elastic materials, which as well as freely realising movements in counter-currents, can also recreate movements such as those described above. These lures usually completely or partially imitate to a large degree, the shape of a number of vertebrate and invertebrate aquatic animals, common prey for the majority of sports fish. Furthermore, they can incorporate colours and other types of attractants for the fish, such as chemical stimulants, natural or synthetic, related to the organic systems of the usual prey or to the sensorial mechanisms of the predators.

The object of manufacturing these artificial baits is to substitute the many natural baits, such as insects, worms, molluscs, crustacea, fish and other animal groups, used in both commercial and recreational fishing, whose availability not only depends on its prior capture, but also on its heterogeneous quality and on the intermittent seasonal presence of such creatures. This variability is further conditioned by punctual extrinsic factors, such as the climate, which can augment the efforts and the cost in obtaining such baits to an extraordinary extent. These factors critically influence in the returns of commercial fishing of different species, as well as in the market value of these fish, as well as influencing the sporting activity to an important extent.

The development of artificial baits and lures has been the subject of numerous patents, which have dealt with aspects from: the natural and/or synthetic materials used to manufacture the baits; their shapes/forms, colours and dynamic design; the hormonal, gustatory and olfactory additives used as attractants; the way in which these additives are integrated into the lure (encapsulated, dissolved, embedded, as a coating, etc.); as well as the way to combine in the same lure natural and artificial elements capable of imitating the effects of the baits used, for example, in commercial fishing.

Those lures that attempt to imitate natural baits must try look to achieve a compromise between: their stability when moist (to be able to be hooked, without becoming too soft or disintegrating in the water); the constituency and initial malleability of its matrix; the colour, texture, consistency, flexibility and elasticity; the aroma or attraction; the capacity to retain and diffuse in a controlled manner the attractants; the tensile strengh and tearing strengh; and the dynamic capacity (or capacity to "wriggle"), that to the date of this current patent have not been satisfactorily achieved. Furthermore, as is every day more important and demanded in the market, these must be biodegradable, respecting the environment and innocuous both for humans and for aquatic animals.

In reference to the baits destined for use in commercial fishing, developments have been focused towards the design of chemical attractants for diverse marine species of fish, based in biodegradable substrates, as laid out in the patent application submitted by Cross, Gary (British patent application GB 0212538.3, Oceanbait Ltd. 30 May, 2002).

In the past various types of artificial soft or semi-soft baits have been proposed, which contain attractants for fish that are either natural or artificial. Some of these are made up of: a fleshy mass of plastic; synthetic malleable flexible or rigid plastics (PVCs) capable of accommodating natural or synthetic attractants in their pores; gelatinous biodegradable masses and spongy bodies. With the aim of avoiding the use of rubbery plastics such as the traditional PVC's softened with phtalates, the so-called vinyl's, diverse patents have dealt with trying to create a bait using alimentary and animal sub-products to generate semi-solid plastic and well compacted masses whose own scent is the principal attractant; such as the patent U.S. Pat. No. 4,731,247 of Wolford et al. (1988). In these baits, olfactory stimulants such as the liquidated remains of fish are mixed with a water-soluble cellulose ether and with a plasticiser, in order to form a solid composite that can be used as such or stuffed into the form of a sausage. A serious inconvenience of these baits is that they can only be used exclusively as immobile baits or as bait in traps for fish or crustacea. Due to their poor consistency and stability in humid conditions, it is impossible to use these as bait for the hook of a rod.

In the patent of Prochnow U.S. Pat. No. 4,826,691, 1989 a composition was described as a carrier for attractant additives, composed of a cellulose ether. In another patent, U.S. Pat. No. 5,089,277, 1992, the same author described a bait formed by a sufficiently flexible mass that it could be molded into different shapes and placed around a hook, and that was comprised of a mixture in a sufficiently aqueous solution, of a poly-alkylene-glycol and a cellulose ether such as poly-ethylene-glycol and the carboxy-methylcellulose (CMC). In a new patent, U.S. Pat. No. 5,827,551, 1998, Prochnow also described an attractant formulation for fish, and more specifically for "Black bass", destined to impregnate or coat a PVC vinyl style lure that could remain attached to the bait during a certain period of time. In this way, the slow liberation of the attractants would be permitted but as in previous cases, these would finally end up dissolving and disappearing, unmasking upon its disappearance, the scent of the PVC and its chemical modifying agents.

In reference to the capacity of the baits to degrade in the environment, the patent of Patrick Riley, WO 96/39861 (19 Dec. 1996) describes a formulation to create a soft biodegradable bait based on a polysaccharide (gellan gum or kelcogel), guar gum and PVC together with plasticising agents, that have the serious inconvenience of the liberation of the plastic in the process. Thus, in the presence of the bait a repellent smell is given off that is rejected by the fish.

The concept of biodegradability can often be misinterpreted. It is considered that something is biodegradable when through the action of microorganisms, it is completely degraded liberating $CO_2$, water, salts, methane and biomass. The biodegradation includes two steps: the depolymerisation and the mineralisation. The disaggregation of a material into more elemental parts does not imply its biodegradation until their molecules have not suffered the aforementioned steps. The plastics such as PVC, possess large molecules that microorganisms cannot degrade and as such although they may desegregate, they remain in the environment for many years.

The stability of the bait in water is fundamental when it must be used as a lure with a hook, given that dragging it may precipitate its dispersion, dissolution or fragmentation, thereby losing its shape and/or attractive properties. The bites of fish in their many nibbles, as well as the struggle that develops during the catch can also break or unhook the bait with ease. An attempt to combine the biodegradability of the bait with an improvement in the strengh of the plastic matrix from which it is made, as well as retaining its capacity to liberate the attractants in an efficient manner is dealt with in the patent of Donald W. Kelly U.S. Pat. No. 6,174,525 B1 (16 Jan. 2001). In this patent, a matrix of gel was presented that had to be cured by freezing in order to favour the appearance of hydrogen bonds to give greater strength to a mix comprised of: at least one water soluble long chain poly-hydroxy-polymer such as PVA (poly-vinyl alcohol) and optionally Amorphophallus konjac (glucomannan or gum konjac), or a polymeric soluble gum such as the iota-carrageenans, or the gum xanthan, and also an aromatic hydroxyl compound to accelerate the formation of hydrogen bonds from the group of catechol, hydroquinone, galic acid etc. The mix must be elaborated at high temperatures (between 87 and 93° C.), and is shaped while warm along with attractants for fish (Berkley's) to form figures and lures, with the ensuing cost in energy. A further disadvantage with these lures is that in order to obtain sufficient strengh when they are larger than 2 inches, they must be submitted to prior curing, in this case through cycles of freezing and thawing, prolonging the process excessively and with the result the these lures are also partially soluble in water.

The introduction of gelatin gels in patents for fishing baits, was initially motivated by its role as a carrier and agglutinating agent for the additives, taking advantage of its soft texture and its biodegradable nature. This is reflected in the Japonese patent JP2002223670 (K. Saiseki, 13 Aug. 2002) in which a solution of gelatin was incorporated as the main ingredient along with plasticisers and aromatic agents in order to obtain a biodegradable bait, and in which crosslinking agents were used for its hardening. Alternatively in the patent of Shervin R. Brown, U.S. Pat. No. 4,764,383 (16 Aug. 1988) a bait was proposed that was based on gelatin as the main ingredient, along with a plasticising agent such as poly-ethylene-glycol and fish oil, that possesses a texture and elasticity similar to that of a natural bait and that can be cut into pieces that can be hooked on successive occasions. Even gelatin can be used to provide the mass with better consistency and cohesion, as in the patent of Associates of Cape Cod, Inc. (U.S. Pat. No. 6,391,295 B1, 2002) in which the attractant formed by the haemolymph of the "horseshoe crab" frozen and dried, or coagulated, is incorporated into a agglutinate to form a solid, the agglutinate being a gel of the: sodium alginate, gelatin, agar or collagen based adhesive paste.

The use of a gel matrix based on gelatin, has been induced both by the search for a material with a soft texture, that is elastic and malleable, as well as biodegradable, and that has a capacity to diffuse and slowly liberate attractant aromas and molecules. However, in none of the cited cases do the gels or the agglutinates used have on their own, or when mixed together, sufficient cohesion and strengh against tearing, stretching or crushing forces necessary to avoid the breaking or disintegration of the lure, with the consequent loss of efficiency and the added cost of having to continually replace it. Moreover, they are also not apt to be shaped into the form of animals as can be achieved, for example, with PVC. For this reason, attempts have been made to reinforce the gel matrix with diverse fibrous materials such as paper, cotton, woven and non-woven cloth both natural and synthetic, plastics, etc.

With the aim of reinforcing the structure of the gel matrix, the introduction of natural or artificial fibres into the mix was proposed prior to its gelling. The patent U.S. Pat. No. 4,245,420 of W. E. S. Carr (1981) described an amorphous artificial bait made up of a hydrophilic matrix reinforced with fibres and other natural or synthetic materials such as paper, skin, leather, wood, textiles, etc., that are insoluble in water, semi-rigid, flexible and permeable so that attractant substances can diffuse from them. The matrix is solid and semi-rigid, made up of a colloidal solution of warm water, mixed with other macromolecules, and a hydrophilic protein such as gelatin. It was pointed out that the gels can be modified with other gel-like thickening materials such as gums, agar, pectins, carrageenans, proteins, collagen and synthetic polymers. An exclusive example is the use of gelatin along with the inclusion of moisteners such as glycerine. The diffusion of the attractants through the matrix of the bait is prolonged by the incorporation of salts such a NaCl. These baits lack the sufficient mechanical properties (in terms of tensile strengh, tearing strengh, etc.) to be used as soft baits for casting in the same way as soft synthetic baits (vinyl), as well as not being apt to be molded into animal shapes and the fact that they dissolve progressively in the water. The manufacturing process of the gel composite and its subsequent molding must be performed in hot water or at a temperature close to the melting point, to be able to dissolve and maintain the gelatine as a sol. Subsequently the bait must be chilled to solidify, which implies elevated costs of production. In another later patent, W. E. S. Carr, U.S. Pat. No. 4,463,018 (1984) also used a water insoluble matrix comprised of gelatine, agar, Carob bean gum, Celufil and glycerol, and that was reinforced with flexible materials. This is permeable to the diffusion and passage of attractants for the fish, which can be liberated in this way at a controlled rate over a prolonged time period once submerged in the water. The bait comes in the shape of rolled leaves that can be cut into chunks for use. Another example, in which furthermore the attractants are of natural origin, is the case of the patent of Jay B. Burreson U.S. Pat. No. 4,882,174 (21 Nov. 1989) that deals with a natural bait made up of a gel-like matrix of gelatin and/or pectin dissolved in water, and that incorporates ground seafood (herrings) and a layer of a fibrous material such as cotton, and that can be cut into chunks or pieces that are used as bait for the fish. Another example are the patents of the same applicant, U.S. Pat. No. 5,197,219 and U.S. Pat. No. 5,062,235 in which rayon fibres are introduced into the mix with the gelling agents and additives.

In all these cases, the use of fibres and other synthetic strengthening materials, without which the matrix would lack of the necessary mechanical properties, make the molding of the gelatinous matrix difficult. Furthermore, they diminish the possibility of the disintegration and the biodegradability of the product once abandoned in the environment, additionally making it indigestible for the animals. The manufacturing process has also to be performed at raised temperatures to dissolve the gelatine.

An attempt to create a gelatinous matrix of greater strengh to those previously proposed forms the basis of the American patent application of Howard D. Ollis, US 20030066231 April, 2003. In this it is claimed that a biodegradable lure molded into the shape of animals, comprised of a mix of carbohydrates and natural proteins such as casein, serum proteins, gelatin, gluten, soya and albumin can be shaped into the form of small animals. This must be cured in order to augment its strengh and to be able to maintain it attached to the hook. This formulation has the disadvantage that the process of curing is posterior to the molding and lasts between 20 and 50 hours. This curing process provokes the shrinking of the lure up to at least 50% which, along with the fact that the composition requires an elevated temperature for its elaboration and injection molding, constitutes a notable limiting factor for productivity. Furthermore the baits dissolve progressively in water during their use and become unhooked or break after a series of more of 20 casts. Moreover, the tensile strengh does not exceed 1.5 kg (Instron Testing apparatus load/5 speed/200).

On occasion, the use of collagen sausage skins has been mentioned to contain other agglutinated substances in pastes or gels that constitute the bait. For example the use of cured, dried and perforated collagen casing in fishing baits has been referred to (DEVRO) in the patent of P. Morton (U.S. Pat. No. 5,216,829, 1993), with the aim of stuffing into this a mass of ground meat remains and in this way ensuring the slow liberation of molecules and aromas. In the same way, the patent of Teepak U.S. Pat. No. 5,281,425 (K. V. Stribling, 25 Jan. 1994), should be mentioned in which a mass of meat remains that proceed from the boning and preparation of birds, pigs or beef, are stuffed into a collagen casing to make sausages, dried and cured, which are later segmented and sealed, constituting a bait that stimulates the olfaction of marine crustacea.

Hence, there is still a need for state of the art technology to provide an alternative bait to confront the problem of the scarcity, variability and the cost of baits for commercial fishing that heavily condition the economics of such activities. The solution proposed by the present invention consists in producing a universal bait based on collagen fibres that can substitute the usual baits without producing risks for the environment, and that furthermore are of a soft texture, are flexible and malleable, have a good capacity to diffuse and liberate attractant substances, present excellent mechanical properties, principally in as much as their strengh to breakage and to tearing, and that are easy to manipulate, transport and store.

OBJECT OF THE INVENTION

The present invention, as such, is aimed to produce an universal fishing bait comprised fundamentally of a matrix of fibrous collagen that can be used in a shape or predetermined design, both in marine commercial fishing and in marine or freshwater sports fishing.

Another object of the invention is that this bait should be 100% biodegradable in the short term when abandoned in the natural environment, without liberating in this process any environmentally noxious substance or substances that in the future could have negative effects on human health.

Another object of the invention is to create a bait that should be innocuous for humans or the animals that could ingest it, contrary to what currently occurs with the majority of the soft baits, and that can be digested by fish and other animals given that it is basically composed of protein.

Another object of the invention is to produce a bait that, in combination with the above characteristics and without the need to possess a spongy structure, it should be capable of incorporating and fixing into its structure, diverse substances and molecules that act as attractants for the fish, and at the same time, facilitating the diffusion of these substances when the bait is in the water, thereby permitting the selective use of these attractants and the bait.

Another object is to provide a bait that in combination with the aforementioned characteristics, also possesses a texture similar to that of live or natural baits, whose consistency, flexibility, elasticity, and buoyancy confer it with a lifelike aspect, that stimulates the persistent biting of the fish and avoids rejection, as occurs with other soft baits due to the smell of the PVC and its additives.

Another object is to provide a bait that in combination with the aforementioned characteristics, is also resistant to traction and to tearing permitting it to be firmly hooked and to last longer, even after many casts and bites.

Another object is to provide a bait that in combination with the aforementioned characteristics, can be configured into any design imitating in this way the shape of any animal or common prey of the fish to which it is directed, or into any imaginary design that other materials and or manufacturing processes would find it hard to reproduce. It is stable in water and doesn't disintegrate nor dissolve, and it can be dried and re-hydrated, in this way permitting the adsorption of new doses of attractants, also permitting the personalised recycling and reutilization.

Another object of the invention is to provide a fishing bait or lure that in combination with all the aforementioned characteristics, possesses a predetermined buoyancy that can be controlled and regulated during the manufacturing process, in order to adapt the bait to the different modalities and uses in sports or commercial fishing.

Another object of the invention is to provide a fishing bait or lure that in combination with all the aforementioned characteristics, should at the same time be easy to store during long periods, and easy to manipulate and transport.

Another object of the invention is to establish a procedure for manufacturing of said universal fishing bait comprised fundamentally of a matrix of fibrous collagen. Such a manufacturing process should not require a significant energetic demand neither in the preparation of the fibrous paste, nor in the process of molding it, and should be accompanied at the same time by a process of rapid fixation or gelling of the fibrous matrix, with the aim of optimising and simplifying the production process, with the ensuing reduction of the costs.

Another object of the invention is to provide a precursor paste of fibrous collagen to use in said procedure.

Finally, a further object of the invention is to use fibrous collagen to prepare said universal fishing bait comprised fundamentally of a matrix of fibrous collagen.

DETAILED DESCRIPTION OF THE INVENTION

Figure 1:
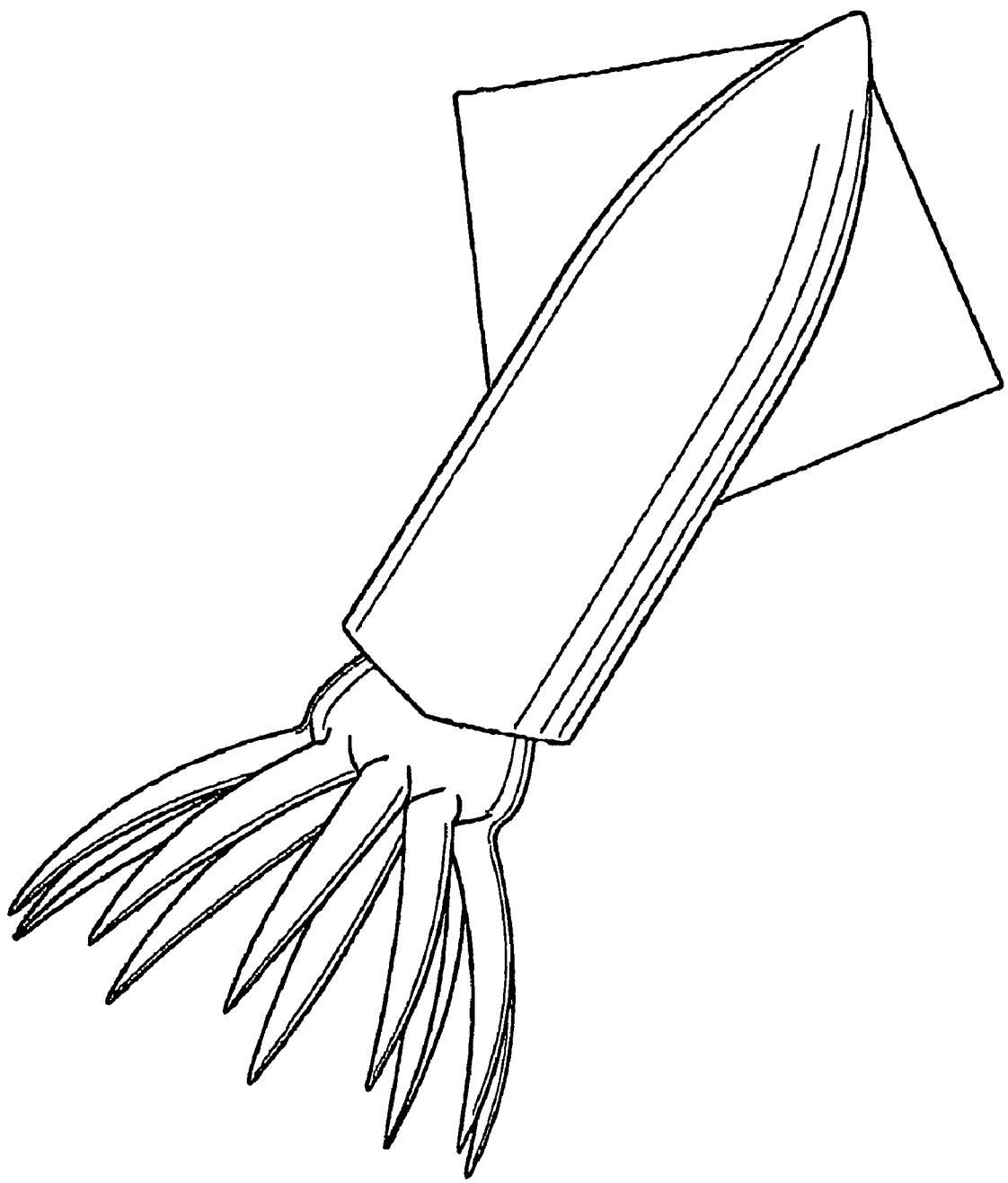
FIG. 1 illustrates a universal fishing bait comprised fundamentally of a matrix of fibrous collagen in the shape of a squid obtained by injection molding.

The present invention provides a universal fishing bait comprised fundamentally of a matrix of fibrous collagen formed into any shape or design capable of attracting fish.

It should be specified that, to all intents and purposes, in the present description of the invention, the terms "bait" and "lure" must be understood as the same thing, given that in both cases they must be capable of attracting, fooling and provoking the bite, in the majority of cases, of fish.

Similarly, it should be understood that in the context of the present invention, the terms fibroid or fibrous refer indistinctly and always, to those collagenous structures and molecular substructures that can be reconstituted and that are produced prior to the result of the gelling process that is described below.

The present invention refers to a bait or lure destined to fishing with a hook or any art that uses a bait to attract fish such as cages, traps, nets, etc. Such a body can be shaped into any form or design capable of attracting the fish such as, for example, balls or quasi-spherical figures, diverse cylindrical (pellets) or long shapes, wormlike, etc.; or imitating any aquatic or terrestrial animal, although preferably those aquatic animals that are the common prey of the fish, such as worms, molluscs cephalopods, crustacea, fish, batrachians, etc.

Likewise, the universal fishing bait comprised fundamentally of a matrix of fibrous collagen of invention can also incorporate, different elements fixed or mobile, such as "spinnerbaits ", "buzzbaits ", "crankbaits ", etc., of diverse nature, including metals, synthetic polymers, natural polymers, wood or any other adequate material, while the collagen remains the substantial part of the bait.

In a particular embodiment of the invention, the matrix of fibrous collagen coats a substrate made up into any shape or design capable of attracting the fish, such as balls or quasi-spherical figures, diverse cylindrical or long shapes (pellets), or wormlike shapes, etc.; or can coats the reproduction of any aquatic or terrestrial animal, although preferentially those aquatic animals that are the common prey of the fish, such as worms, molluscs cephalopods, crustacea, fish, batrachians, etc. as previously indicated.

In another particular embodiment of the invention, the collagen fibres of the body have been orientated in a predetermined manner, in one or various directions, in order to improve the tensile strengh in those directions. This spatial reorientation of the fibres permits the physico-mechanical properties of the bait to be controlled, in particular contributing to the increment both of the tensile strengh as to the tearing strengh of the bait in these directions.

Said orientation of the collagen fibres in the matrix of the bait is produced during the manufacturing process of the bait, in concrete during the formation of the fibres by extrusion, co-extrusion or injection molding for example, as described below.

The peptide nature of the collagen bait invented also permits the fixation through chemical bonds of many molecules of diverse nature, such as amino acids, fats, other peptides, proteins, etc., that are olfactory or hormonal aftractants for the fish and that have to be added as additives in those types of more specific baits, which is a unique capacity, given that it confers the bait with organoleptic properties similar to that of natural baits. On the other hand, the use of crosslinking substances favours the generation of such bonds, as described below.

In another embodiment of the bait presented here as the invention, the fibrous collagen proceeds from any animal source and can be native, partially hydrolysed or chemically modified.

In a preferred embodiment, the fibrous collagen proceeds from vertebrate animals such as fish, amphibia, reptiles, birds or mammals, or of invertebrates such as coelenterates, sponges, worms, tunicates, echinoderms or molluscs.

In an even more preferred embodiment, the fibrous collagen comes from the skin, cartilage, bones, tendons or intestines of vertebrates such as fish, amphibia, reptiles, birds or mammals; or of invertebrate organs such as coelenterates, sponges, worms, tunicates, echinoderms or molluscs that contain it.

It is known that native collagen is a fibroid scleroprotein, a basic component of animal connective tissue and of bones and tendons. It is formed of 19 amino acids, tryptophan being absent, and its high content of glycine (33%), proline and hydroxyproline (22%) stands out. This high concentration of proline, hydroxyproline and glycine, which constitutes more that 50% of the amino acids, is characteristic of all types of collagen. These amino acids form a repetitive sequence along with a third amino acid, and play a fundamental role in the three-dimensional forming of the precursor of collagen, the molecule tropocollagen.

In this molecule the chains of amino acids have a length of 290 nm and form a triple helical structure. Five tropocollagen molecules group together longitudinally, overlapping over a ¼ of their length to form a microfibre of 3.6 nm in diameter. The microfibres in turn are grouped in a tetragonal structure to form subfibres of approximately 30 nm in diameter. These subfibres assemble to form the collagen fibre that is the basic unit of the connective tissues. Such fibriles vary in diameter from 50 to 500 nm, depending on the type of tissue and the age of the animal. The fibriles of collagen are surrounded by a extracellular matrix that maintains the integrity and the architecture of the collagen ("Hierarchical Structure of Collagen Composite Systems". E. Baer, J. J. Cassidy and A. Hiltner. *Pure Appl. Chem.* 1991, 63(7), 961-973). Finally, these fibriles are grouped together to form fibres that in turn constitute bundles and fascicles with a determined structure and orientation, depending on the tissue in which they are found, that also defines the physico-mechanical properties that are required. Such fibrilar or fibrous structures are the basis of the present application.

Through the hydrolysis (acidic or basic) of the collagen, along with a thermal treatment, collagen can be converted bydegradation into anothersubstance called gelatin. In such a conversion it is necessary to break the hydrogen bridges that stabilise the triple helix, transforming it into the 'random configuration' typical of gelatin. After degradation, three basic types of new chains result: the alpha chains, comprised of a single peptide chain; the beta chains, formed of two connected peptide chains; and the gamma chains, with three interconnected chains. As such, a sample of gelatin has various molecular weights that usually vary between 10,000 to 65,000 Daltons, significantly less than that of a molecule of tropocollagen (that varies between 345,000-360,000 Daltons); and as such gelatin lacks the properties which are the object of this invention is aimed to fulfil.

As indicated, the collagen of the fibrous matrix of the bait invented can be collagen that is partially hydrolysed, even though it may be reconstituted in such a way that it recovers the fibril structure of the native collagen.

Likewise, the collagen can be collagen that is chemically modified, such as succinylated, acylated, methylated or esterified, collagen for example. The native collagen possesses abundant —$NH_2$ and —COOH groups in its structure, that enable various chemicals modifications to be carried out on this molecule through the acylation, for example, of the amino group in a reaction with a mix of acetic anhydride and acid, or the succinylation in a reaction with the succinyl anhydride. The carboxylic groups can be esterified in reaction with water soluble aliphatic alcohol's such as methanol and ethanol. The use of chemically treated collagens opens the possibility of obtaining more transparent masses among other advantages (U.S. Pat. No. 3,530,037).

In a particular embodiment of the invention, the bait comprised fundamentally of a matrix of fibrous collagen has the capacity to be hydrated and dehydrated in a reversible manner. That is to say that it is capable of swelling by the uptake of liquids when it enters into contact with water or with aqueous solutions, and change texture with the corresponding increase in its flexibility. Furthermore it can be dried and humidified with new aromas, recuperating its original form, enabling it to be adequately manipulated both when dry as well as when humid, and as such prolonging its use.

In a particular embodiment of the invention, the bait comprised fundamentally of a matrix of fibrous collagen is made up of 0.1 to 99.9% by weight of fibrous collagen with respect to the total wet weight of the matrix. Such a wide range of composition is due to that fact that matrix of fibrous collagen can contain a widely varying proportion of water.

One preferred embodiment is a soft bait comprised of 1 to 30%, or preferably of 2 to 20%, of more preferably of 4 to 12% by weight of fibrous collagen with respect to the total wet weight of the matrix.

In another preferred embodiment, a dry bait that is made up of 75 to 99.9%, preferably of 80 to 95%, and more preferably of 85 to 95%, and even more preferably of 85 to 90% by weight of fibrous collagen with respect to the total wet weight of the matrix.

In a particular embodiment of the bait invented, the matrix comprises, as well as the fibrous collagen, one or various attractant substances.

Surprisingly it has been found that after a series of field tests, the reconstituted mass of fibrous collagen possesses in its own right, a certain attraction for diverse fish such as carps, barbs or black bass, which does not need to be unmasked or reinforced by other substances. Nevertheless, the incorporation of such attractant substances can increase tremendously the potency or the activity of the bait as a lure, whose form, colour and texture complement its efficiency.

In a particular embodiment, such attractant substances might be natural or synthetic, organic or inorganic, and preferably proteins, and even more preferably blood proteins of vertebrate animals or invertebrates, L-amino acids, nucleotides, nucleosides, alcohol's, sugars, fats, or meat extracts, fish extracts or other aquatic organisms extracts.

In a preferred embodiment, such attractant substances are incorporated into the bait during its very fabrication through the mixing of said attractant substances with an aqueous dispersion of the fibrous collagen when preparing the precursor paste from which the fibrous collagen matrix will be made.

In another preferred embodiment, said attractant substances are incorporated into the bait by impregnation after the bait has been made up.

In another preferred embodiment, said attractant substances are chemically crosslinked to the molecules of collagen through the action of crosslinking agents.

One of the great advantages the bait fundamentally comprised of a matrix of fibrous collagen is the surprising fact that it possesses the capacity to bind attractant molecules for the animals for which it is destined. Such molecules, once incorporated amongst the collagen dispersion, remains fixed in the fibrous matrix and partially by existing freely in the water of the collagen and in part through covalent chemical bonds that can be promoted by crosslinking agents, in the same way that occurs with other elements that are crosslinked with the collagen fibres: acetals and hemi-acetals between the hydroxyls of the protein and the aldehyde groups of some molecules, imino bonds (with the amine —$NH_2$ groups of the protein); with the thiol groups of the non-collagenous proteins (—SH) to form sulphide bonds, etc.; or peptide bonds; and also the non-covalent chemical bonds such as hydrogen bridges, ionic bonds, etc.

The molecules fixed to the collagen provide the bait with their own aroma, while the free molecules can diffuse through the matrix and be liberated into the environment in a gradual manner. This signifies that the attractant can draw the attention of the fish during a prolonged time period and that the bait will always conserve its own aroma, which united to the meaty texture the bait, constitutes a major advantage when it comes to the bite, given that the predator, after a first contact with the lure, will not reject the bait, maintaining the bite until the hook has been taken.

This is precisely one of the disadvantages of the soft vinyl baits impregnated in attractants, the fact that these are not fixed into the chemical structure of the lure, and they are only capable of masking the smell of the vinyl during a short time period. When the substantial loss of the effect of the attractant occurs, the fish after a bite reject the lure. This converts the phenomenon described in the present invention into a advantageous novelty.

In another particular embodiment of the present invention, the bait it also comprises one or more additives selected from between crosslinking agents; other non-collagenous proteins; strengtheners; gelling agents; plasticising agents; lubricants; colorants; preservatives and antioxidants; and agents that modify the density.

In a particular embodiment of the bait invented, the dry weight of the total protein, collagenous and non-collagenous, is greater than 50% of the total dry weight of the matrix.

In another particular embodiment, the crosslinking agents a red selected between aldehydes, preferably glyoxal, glutaraldehyde or formaldehyde; sugars; modified starches; di-isocyanates aliphatic, aromatic or hydroaromatic, preferably hexamethylene di-isocyanate; polyethyleneglycol diglycidyl ether; metal cations, preferably of aluminium or iron; oils and fats, preferably of polyunsaturated fatty acids; or tanning enzymes/proteins, preferably acyl transferases, transglutaminases (Ajinomoto, U.S. Pat. No. 5,968,568, 1999; Zymogenetics, WO97/40701 International Application 1997), lacase or bilirubin oxidase; diepoxides such as the 1,4 butanediol diglycil ether; and modified resins of melamine.

The use of crosslinking agents that promote chemical crosslinking bonds permit the fixation of dispersion into a gel with the consequent acquisition of the physico-mechanical properties necessary for their manipulation and use as "soft bait". Similarly, the use of said crosslinkers allows the fixation to the collagenous matrix of the non-collagenous molecules as well as the attractant substances. The term "crosslinking" should be understood, in the context of the present invention, as similar to that of a "crosslinker".

In another particular embodiment of the bait invented, the non-collagenous proteins can be selected from between proteins of animal origin, preferably keratine, elastin, milk serum, casein, albumin, fibrin, actin or myosin, and proteins of vegetable origin, preferably wheat gluten, zeine or globulins of leguminous seeds such as soya or peas.

Such proteins not only modify the properties of the bait to a degree, but they also act as attractant substances for the fish. When the collagen is mixed with other proteins, the total dry weight of protein, collagenous and non-collagenous, must be greater than 50% of the total dry weight of the matrix, as indicated above. When various non-collagenous proteins are included they can be mixed among themselves in any proportion.

In another particular embodiment of the bait invented, the strengthening agents are selected from cellulose fibres; polysaccharides derived from chitin, preferably polymers of the n-acetyl-glucosamine or chitosan; starches, preferably dialdehyde starch; synthetic resins, preferably hydrolysed poly-vinyl-alcohol (PVA); esterified water soluble polysaccharides, preferably propylene glycol alginate (PGA) (Higgins 1978 U.S. Pat. No. 4,096,282).

Likewise, in some particular embodiment it is possible to use as reinforcing agents, filaments of cured collagen, cords or plaits of filaments of cured collagen, tissues or nets of cured collagen, or belts or films of cured collagen; vegetable fibres, preferably cotton, flax, hemp or abaca, in the form of woven or unwoven cloth; and the fibres may be joined with resins or viscose.

The use of said reinforcing agents permits the strengthening of the fibrous structure and/or will in general improve the physico-mechanical properties of the bait.

If vegetable fibres are used as reinforcing agents, these can form clothes or sheets, woven or unwoven, and the fibres can be free or joined between themselves by binding agents. This is the case of the fibres of cotton, flax, hemp, or abaca, which can be present in the form of cloth or paper sheets and where the fibres can be bound together with resins or viscose. Some of the procedures of conformation and po-conformation described below permit the use of these reinforcing agents and their incorporation into the bait, without any detriment to the final results.

Should the reinforcing agents used be composed of cured collagen as highlighted above (filaments, laces or any type of plait of such lace filaments, woven or in nets, or also as tapes or films), the total dry weight of protein, collagenous and non-collagenous, must be greater than 50% of the total dry weight of the matrix.

In another particular embodiment of the invention, the gelling agents are selected from the group of cellulose ethers, preferably carboxymethyl cellulose, hidroxymethyl cellulose, hidroxypropyl cellulose or hidroxypropylmethyl cellulose; or of the group of hydrocolloids, preferably alginates (Easton 1986 U.S. Pat. No. 4,614,794), carrageenans, agar, furcellerans, chitosan, guar gum, locust bean/garrofin gum, gum arabic, gum tragacanth, gum karaya, gum gellan, xanthan gum, pectins, glucomannans (Maynard 1999 U.S. Pat. No. 5,962,053), or honey, coupleded to promoters of gelling selected from the group of metal salts of group IIA, preferably beryllium, calcium or strontium, of group IIB, preferably zinc or cadmium, or of group IIIA, preferably aluminium. Said promoters of gelling are capable of provoking the gelling or complexing of some of the cited components to which they bind.

Said gelling compounds are hydrophilic compounds that contribute to the retention of water in the matrix, which prolongs the hydrated state of the bait and its fresh aspect, as well as improving the elasticity and other mechanical properties. In a preferred production process, said gelling agents were employed in a proportion of 0.1 to 25%, preferably of 2 to 10%, more preferably of 1.5 to 5.5% of the total dry weight of the matrix.

In another preferred embodiment of the invention, the plasticising agents are selected from polyhydric alcohols such as glycerol, sorbitol, sorbitan, mannitol, maltitol, propyleneglycol, ethylene-glycol, Panthenol, propylene glycol-alginate, and polymeric sugars, saccharose, or maltose.

These edible and low molecular weight plasticising agents help in the dispersion of the proteins in the plastic mass and contribute to improve the mechano-rheological properties of the bait. In another preferred production process, said plasticising agents are used in a proportion of 10 to 25% of the total dry weight of the matrix.

In another preferred embodiment of the invention, the lubricants are selected from fats; mono-, di- and triesters of the edible polyhydric alcohols; vegetable oils preferably hydrogenated; mineral oils; edible fatty acids; phospholipids, preferably lecithin; silicon oil and mucopolysaccharides.

The bait can contain small but effective quantities, in the order of 3 to the 6% of the total dry weight of the matrix, of a lubricant that proves to have a coadjuvant effect in the operation of molding and the demolding, or in the operation of extrusion. Additionally, these substances can perform the function of plasticisers as well as contributing to the attraction exerted by the bait.

In another particular embodiment of the bait of the invention, the colorants are selected from the organic or inorganic, natural or artificial colorants, and preferably from annato, iron and titanium oxides, cochineal carmine, squid ink, caramel, glitter, indigo, chlorophyll's, anthocyanin's, carotenes, turmeric or vegetable carbon.

The bait can be comprised of one or more of the numerous pigments, colorant substances or particles, or modifiers of the colour that are already used in the food industry such as those mentioned. The aforementioned colorants are capable of giving the bait a more real or fantastic aspect permitting a wide variety of designs of the bait to be obtained.

In another embodiment of the bait of the invention, the preservatives and antioxidants are selected from between ascorbic acid, ascorbyl palmitate, sodium bisulphate, calcium propionate, sorbic acid, potassium sorbate, butylated hydroxyanisole (BHA), butylated hydroxytoluene (BHT), ethoxyquin, lactic acid, acetic acid, benzoic acid, sodium benzoate, ethyl-o-hydroxybenzoate, methyl-p-hydroxybenzoate, propyl-p-hydroxybenzoate, spices and vegetable extracts.

The bait can incorporate preservatives and antioxidants to prolong its useful life, maintaining its properties and its fresh aspect.

In another particular embodiment of the bait invented, agents can be added that modify its density such as substances of a density less than 1, preferably fats and oils, or solutions of density greater that 1, preferably molasses.

The fats used in the bait invented such as attractants, crosslinkers, lubricants or modifiers of the density can be of animal, vegetable or mineral origin, and can be saturated fats, saturated or unsaturated oils, such as the mono-, di- and triesters of the edible polyhydric alcohols, or fatty acids. They can be used alone or mixed together in any proportion, in such a fashion that they constitute 2 to 15% of the total dry weight of the matrix.

Another aspect of the invention is that it provides a procedure for the manufacture of a universal fishing bait comprised fundamentally of a matrix of fibrous collagen made up into any shape or design capable of attracting the fish, characterised in that it comprises the stages of:

a) preparation of one or various precursor pastes, being at least one of them a precursor paste comprising fibrous collagen;

b) optional mixing of at least two of the pastes resulting from stage a);

c) conformation of the paste or pastes, or of the mix of pastes obtained in stages a) or b); and d) optional post-conformation of the shape resulting from stage c); wherein prior to stage c) the crosslinking agent is added and/or after stages c) or d) a coagulation step is included by immersion in a bath or through treatment in a coagulant atmosphere.

Another aspect of the invention is that a precursor paste of fibrous collagen is produced to generate the universal fishing bait comprised fundamentally of a matrix of fibrous collagen molded into any shape or design capable of attracting fish. Said paste is an aqueous dispersion of fibrous collagen that comprises a dispersed fraction of insoluble fibrous collagen, a dissolved fraction of soluble fibrous collagen or a fraction of chemically modified fibrous collagen, soluble or insoluble, or a mix of these in any proportion, optionally mixed with attractant substances or other additives in such a way that the total dry weight of protein, collagenous and non-collagenous, should be greater than 50% of the total dry weight of the paste.

In a particular embodiment, said precursor paste is a mix of at least two precursor pastes with distinct proportions of fibrous collagen and/or additives, the collagen being from the same or different animal sources and the additives being of the same or different nature.

It is known that the collagen is capable of forming aqueous dispersions with a high water content; and that the higher water content occurs at a pH of around 2 or 13, which corresponds to the maximal swelling of the protein. Nevertheless, and given that the highest water content is reached at acidic pH's, the acid dispersions would be those preferred for the process of extrusion or injection.

The collagen dispersion can be obtained by any of the techniques described in the numerous patents to date, for example those disclosed in WO92/01394, DE642922, DE659490, U.S. Pat. Nos. 2,920,000, 3,123,481, 3,123,653, 3,314,861, 3,664,844, 4,196,223, 4,407,829, 4,615,889, 5,411,887, 5,940,849. Also emulsions can be used that are comprised of soluble collagen treated with proteolytic enzymes, such as the techniques described in U.S. Pat. Nos. 3,529,530, 4,140,537, 4,223,984, 4,268,131, 5,456,745; and that conserve the fibroid structure of the native collagen although it may be partially hydrolysed, but in a manner it can always be reconstituted; and also the emulsions formed by mixtures of soluble and insoluble fibrous collagen obtained by the methods described.

Preparation of the Precursor Paste of Fibrous Collagen

The fibrillar or fibrous collagen is recovered from the natural sources (e.g. skin, tendons, intestines) principally by two methods: 1) starting preferentially from skin or hides and dissolving the collagen in acids (e.g. acetic acid), bases (e.g. NaOH), diluted salts (e.g. NaCl) or enzymatic digestion using non-collagenase proteolytic enzymes (e.g. pepsin, trypsin, pronase or proctase) from which a soluble heteroleptic and fibroid fraction of collagen is obtained that can be reconstituted; or 2) by extraction, in a solid and not a dissolved form of fibres proceeding from the tissues that contain collagen (the dermis of the skin and tendons) through the activity of mechanical agents accompanied on occasions by the enzymatic action of e.g. pancreatine (in order to liberate the fibrilar bundles of elastin) as described below.

In general, in order to obtain a dispersion of fibrous collagen (an aspect that does not form part of the object of the invention), different types of connective tissues can be used such as the skin, tendons, ligaments, etc., and/or digestive tissues, such as intestines, stomach, etc., coming from mammals, birds, reptiles and fish. Preferentially the dermis of cattle and/or pig skin is used, or sheep and/or pig intestines. The procedure to obtain a dispersion of fibrous collagen could be any of those described in the abundant methods published in the literature mentioned, although preferentially a method will be used that includes the stages that are described below.

In the case of using skin as the tissue source of the collagen, we can start with whole skins or fragments of skin that have been recovered during the process of skinning.

Fresh, salted or frozen skins, can be used, that are submitted to the following treatments, although not all are necessary, nor are they applied strictly in the order described:

Washing and soaking of the skin, to eliminate dirt, non-collagenous proteins and to hydrate the fibres of collagen.

1. Stripping with sulphur and alkalis, with the aim of hydrolysing and eliminating the hair.
2. Mechanical stripping to eliminate the fats and non-collagenous protein.
3. Division into two laminas, to separate the dermis from the epidermis.
4. Mechanically chopping into pieces.
5. Removing fats by physical, chemical or enzymatic procedures.
6. Alkaline treatment, preferably with sodium and/or calcium hydroxide, with the aim of purifying, partially hydrolysing and opening the structure of the collagen fibre.
7. Remove the alkali by employing acids or ammonium salts.
8. Acid treatment by adding inorganic acids such as HCl, or organic acids such as acetic acid, lactic, etc., with the aim of reaching a pH at which the collagen fibres are optimally swollen.
9. Mechanical milling and removal of the fibres, with the aim of preparing a collagenous malleable paste that can be extruded.

When the tissue source of collagen is the intestine and/or tendons, the starting material is fresh, frozen, salted or conserved in brine. The tissues are submitted to a process similar to the described for skins:

1. Mechanical and/or manual elimination of the associated fats.
2. Cutting into pieces.
3. Washing and soaking of the material, with the aim of removing dirt, non-collagenous proteins and to hydrate the fibres of collagen.
4. Alkali treatment, as above, preferentially with sodium and/or calcium hydroxide, with the aim of purifying, partially hydrolysing and opening the structure of the collagen fibre.
5. Remove the alkali by employing acids or ammonium salts 6. Acid treatment by adding inorganic acids such as HCl, or organic acids such as acetic acid, lactic, etc., with the aim of reaching a pH at which the collagen fibres are optimally swollen. Mechanical milling and removal of the fibres, with the aim of preparing a collagenous malleable paste that can be extruded. In order to obtain a dispersion of soluble fibroid collagen, to be used alone or in a mix with that produced as above, any of the known methods in the technique are recommended, and as a reference that described in Miyatas' patent U.S. Pat. No. 4,268,131, 1981. Collagen from different animal sources and/or tissues can be mixed together as can be the collagenous emulsions of different structures, in function of the physicochemical characteristics of the collagen with which they are formed.

7. The appropriate collagen content of the emulsion that is obtained is adjusted by adding water and during this stage, to the dilution can also be carried out by adjusting the pH that should preferentially lie between 1.5 and 4.0.

Should different additives be required, such as those mentioned above, they can also be added although some of those can be incorporated into the mass at later stages.

Afterwards, the mixture can be submitted, should it be necessary, to a process of mechanical homogenisation, in which size of the collagen are reduced to that required, with a view to facilitating the conformation operations.

In a particular embodiment of the invention, the procedure is carried out at a temperature that does not produce a substantial denaturalisation or degradation of the collagen.

All the treatments in which the tissue that is the source of collagen and/or the collagenous paste are at pH$\leq$4.0 and/or pH$\geq$10, are performed at a temperature $\leq$25° C. with the aim of conserving the fibroid structure of the collagen, and avoid the undesirable conversion of the collagen to gelatin, given that if this occurs, all the physico-chemical and mechanical properties of the fibrous collagen are lost.

It should be indicated that when in the context of the present invention, the term precursor paste of fibrous collagen is used, it should be understood that it refers to a unique precursor paste or to the result of the mix prior to or simultaneous to the forming (injection molding, for example) of two or more precursor pastes of different nature or composition, although preferentially based on fibrous collagen, as described above. Said pastes can vary in one or more of their components, as for example the colorants, in order to obtain fantastic designs in the lures, or any of the other aforementioned additives.

Likewise, in a particular embodiment of the process to prepare the bait of the invention, the conformation of stage c) was carried out by a process of extrusion, or coextrusion, or injection molding, or electrodeposition or a combination of these processes.

The precursor collagen paste, preferably acidic, can acquire the shape of the bait through the use of techniques such as the extrusion, coextrusion, injection molding, die-casting and/or cutting, accompanied by a process of fixation or gelling.

Whether it is in the dilution process mentioned earlier, or in the moment immediately prior to the forming of the paste (by extrusion or injection molding, for example) substances that will produce the chemical crosslinking of the collagen fibres can be introduced into the collagenous paste, with the aim of obtaining a bait or lure with the desired properties: a soft body, flexible, elastic, resistant to traction and to hooking, of a meaty consistency and stable in the water, innocuous, biodegradable and capable of attracting the fish. Among said substances we can introduce crosslinking agents such as those mentioned previously. Alternatively, or as well as the addition of these crosslinking agents to the collagen paste, we can carry out a process of coagulation in the moment prior to the conformation (extrusion or demolding, for example) and/or to the post-conformation (casting, for example).

The term "gelling" should be understood either as a process of insolubilisation in which the water of the mass is removed by osmosis through immersion in a saline solution, such as for example of sodium chloride or in organic solvents such as for example acetone and/or ethanol, or also in inorganic solvents such as water glass, or by a change in the pH of the emulsion provoked by the immersion in an alkaline solution, for example of sodium carbonate, sodium hydroxide, sodium bicarbonate, ammonium sulphate, ammonium hydroxide, or by treatment with ammonia gas etc.; or either by chemically restructuring the fibrous matrix by immersion or addition of solutions in which crosslinking products of the collagen are dissolved such as those mentioned, promoting the generation of crosslinked bonds between the collagenous fibres generating an insoluble three-dimensional matrix of connected fibres. It can also be understood as a combination of the processes described. Additional methods could be employed such as the freezing of the mass for a period of time and/or thermal treatments. The gelling as such, permits the precursor paste of fibrous collagen to be fixed, transforming it into a gel, which provides strength and cohesion to the molded product as well as a good part of the mechanical and physico-chemical properties.

It is precisely in the mechanical and physico-chemical properties of the reconstituted gelled emulsion of fibrous collagen, in that the extraordinary characteristics of this new type of lure are based.

In respect to the conformation of the precursor paste, diverse methods exist the preferred election of which will depend on the form and characteristics of the bait that it is aimed at generating. When intending to imitate the shape of an animal with a radial and bilateral symmetry or with very specific cavities, the preferred method is the molding injection of the fibrous precursor paste. The crosslinking agents of the paste can be incorporated prior to the injection; in a preferred process these are incorporated into the mass just before the moment of the injection. In this manner we can reduce the time of the injection-molding-demolding process. The incorporation of a lubricant facilitates both the extrusion as well as the demolding. Given the rheology of the fibrous paste of collagen, the injection process must be carried out at a certain pressure in order to procure the penetration of the mass into the mold. The advance of the mass provokes an orientation of the different fibres that comprise the emulsion in the direction of the machine, which contributes to the increment in the tensile strengh and tearing strengh in this direction. The figures obtained can be manipulated by their storage or packaging after a brief period of maturation. Alternatively they can be submerged in a coagulation bath to reduce the time required for maturation. In the molding process, and especially for the large baits, the paste is injected into the cavity of the mold where previously diverse materials have been introduced to reinforce its structure, such as vegetable fibres, nets or plaits of cured collagen, etc.

The conformation-cold coagulation enables at injection molding the process of molding/demolding to be performed rapidly, particularly when injecting into the mold. This affords great advantages in terms of production but also permits the use of other techniques such as the extrusion or the coextrusion, that is associated with an extension of the design possibilities that are difficult to achieve using traditional methods that are subject to compositions that remain fluid due to the temperature, such as PVC and the gels based in gelatins, among others.

In the case of the production of baits with a cylindrical, worm-like, pellet, or tubular form, with any longitudinal striation, flat or with a bilateral symmetry, and with a mix of colours, the preferred method is that of extrusion of the mass through an orifice of a predetermined form (circular, elliptical, triangular, rectangular, polygonal, star-shaped, ringed, with radial grooves etc.). Also, in this case an orientation of the fibres must be produced in the direction of the machine, or even in other orientations of interest, through the use of rotary apparatus in the extrusion headstock. Also in this case, the crosslinking agents are added before or during the extrusion, in the way that the worm or cake obtained can be manipulated without the risk of losing its form or characteristics, although the fixation or coagulation of these can also be performed at the exit from the extrusion headstock through its passage through baths or areas where the atmospheres contains coagulant substances.

Such coagulant baths can be a solution of sodium chloride, sodium sulphate, ammonium sulphate, calcium chloride, orofalkalis such as, for example, sodium hydroxide, potassium hydroxide or ammonium hydroxide; being the solvent of an organic or inorganic type, such as water, ethanol, propanol, acetone, or water glass, for example. The areas containing a coagulant atmosphere can be generated with ammonia gas for example.

In a variant of the invention, the collagen can be used to coat a design made in any other material by the use, for example, of electrodeposition. In this case, the electro-deposition of the collagen will be performed onto an electrode that can be given a predetermined form capable of attracting the fish.

In a particular embodiment of the procedure to prepare the bait invented, the conformation of stage c) is achieved by a process of coextrusion of at least two precursor pastes of fibrous collagen with distinct proportions of fibrous collagen and/or additives, the collagen being from the same or different animal sources and the additives of the same or different natures.

A preferred variant of this procedure is the coextrusion, through which two or more pastes of fibrous collagen, of similar or diverse formulation, call them A, B C, etc., are extruded simultaneously and respectively through, for example, a central orifice with respect to the extrusion headstock (composition A or carrier), that is of a predetermined form (as laid out above) and through a ring of grooves or segmented rings (compositions B, C, etc.), that are concentric to the central orifice, in such a way that the gel of the composition A that leaves through the centre is instantaneously wrapped by one or various external membranes, of diverse thickness and composition (B, C, etc.). This can be in the complete form of a sheath (achieved by ring grooves) giving rise to concentric layers one on top of another, or even in bands, strips or laces of dimensions defined by the segmented grooves, with the possibility of alternating one with the other. In the process of coextrusion, the precursor paste or pastes can be extruded along with other elements to reinforce the structure, such as filaments or cords of cured collagen, sheets or nets of cured collagen, tapes or films of cured collagen, cloths of vegetable fibres woven or unwoven, or any other reinforcing material as described above.

In another particular embodiment of the procedure to prepare the bait invented, the conformation of the stage c) is performed by a process of coextrusion of at least two precursor pastes, at least one of which is a precursor paste that contains fibrous collagen.

As indicated, the composition of these membranes can be of similar or different formulation to that of the carrier material, that would preferentially be of fibrous collagen mixed or not with other components such as those described above, in such a manner that their molecules can be fixed by chemical bonds to the surface of the central cord, forming in this way a compact structure. In other preferred variants, the composition of these concentric membranes, including the most external, could be made up of one or various additive non-collagenous substances, such as been mentioned previously, mixed among themselves in any proportion; and more preferentially, those pertaining to the gelling agents (preferably hydrocolloids), to the attractants and/or to the strengthening agents, if in the final composition of the bait the percentage participation expressed previously should be maintained. In the formulation of these coatings additives can be included, for example, to give a different colour, add diverse particles and substances or attractant molecules that, for any reason should not be used in the fibrous composition of the carrier "A". This procedure therefore permits an increment in the design possibilities of the final product, in order to achieve a variety of results that in any other manner, for example by injection molding or simple extrusion, could not be reached.

The process of coextrusion also involves a treatment of the fibrous paste similar to that described previously, and the fixation of this by gelling that can be performed simultaneously or posterior to the extrusion, by the incorporation of crosslinking substances in both cases, and through coagulating baths or atmospheres at the exit of the extruder. Said treatments can be different for each type of mass (A, B, C, etc.) in function of the design and characteristics of the bait or lure that it is proposed to produce. In the same way as the injection process, the extrusion and coextrusion must be performed at a certain pressure to ensure the advance and exit of the mass through the extrusion headstock which provokes an orientation of the different fibres that comprise the emulsion in the direction of the machine, which along with the fixation of the fibrous structure through chemical bonds provoked by the crosslinking agents, contributes to the increment in the tensile strengh and to tearing in this direction. However, some of the layers can contain fibres that are reorientated in different directions after having been submitted to the effects of rotatory devices during the extrusion.

In a particular embodiment of the procedure to prepare the bait invented, the post-conformation of stage d) is carried out through a process of compression, die-casting or punching or cutting (trimming).

Another variant both of the process of extrusion and of coextrusion is the use, at the exit of the extruder, of a compression molding system or punch, for example, that acts at the exit, generating in one post-conformation stage, a new figure or incorporating certain modifications in the direction of the machine, for example transverse stripes, transverse appendices, transverse rings, etc., that would not be possible to achieve by mere extrusion alone.

The methods of extrusion and coextrusion, followed by or without a post-conformation stage including a process of compression or punching, for example, makes it possible to obtain series of figures continuously, and obviously in a more rapid and economic manner than the injection molding process. In any of the procedures described, a second phase of coagulation can be added to the fabrication of the product: either by immersion in a coagulation bath or by passing it through a coagulant atmosphere.

In a particular embodiment of the procedure to prepare the bait invented comprises a drying stage of the paste or mix of pastes obtained at stages a) or b), or of the forms obtained in the stages c) or d).

In a particular embodiment of the procedure to prepare the bait invented, prior to stages c) or d), an optional controlled stage is incorporated to remove air, preferably through the application of a vacuum.

Hence, through the application of a vacuum during the dilution stage of the preparation of the precursor paste, prior to the forming stage, the content of air in the mix can be regulated, permitting the buoyancy of the bait to be regulated as appropriate. Alternatively, the removal of the air can be included at a later stage.

In another particular embodiment of the procedure to prepare the bait invented, the form obtained after stages c) or d) is submitted to a labelling step, or ink or laser printing, through any conventional system, preferably thermal transfer, inkjet or laser scanning.

Finally, another aspect of the invention is that it provides the use of fibrous collagen in order to prepare a universal fishing bait fundamentally comprised of a gelatinous matrix of fibrous collagen configured into any shape or design capable of attracting the fish.

In general, the bait of fibrous collagen obtained possesses a solid and soft consistency although with a certain degree of elasticity and extremely flexible. It has a bright surface and a moist aspect, and an elevated tensile strengh and tearing strengh. The appearance is meaty, and depending on the colour incorporated into the mass, and of the mold, die or punch used in the conformation of the lure, it can be made to imitate well any prey or bait of the fish, and as has been seen, can acquire the capacity to attract the attention and olfaction of the prey.

The plastic properties of the precursor paste of fibrous collagen permit it to be used and configured or molded into any shape or figure capable of attracting the fish and as such, both its formulation as well as the chemical treatments to which it is submitted for their fixation, confer it with a series of unique characteristics, that constitutes a fishing bait with important advantages that we can resume as:

1. Its malleability permits it to be configured into very precise forms.
2. Its natural colour is similar to the colour of the flesh of the marine animals although it can be coloured and/or mixed with particles of diverse nature.
3. Its fibrous texture is similar to that of the flesh of an invertebrate.
4. It is very stable in water, given that it is previously made insoluble.
5. Its toughness and strengh to the breakage by tearing and stretching is similar or greater than that of the traditional baits, giving it a longer lifespan when confronted with the bites of small fish.
6. Its flexibility and elasticity confer it with a lifelike aspect that facilitates its movement in the water. They also facilitate its manipulation and hooking.
7. Its solid yet soft consistency confers it with a lifelike appearance and enables it to move in a controlled or erratic manner when navigating against the current, as well as to be manipulated and securely fixed to the hook.
8. Its physico-chemical properties, such as its capacity to swell up when in contact with the water, can be controlled and predetermined.
9. Its fibrous hydrophilic matrix permits the diffusion of additives towards its interior when it is moist, these being able to be liberated in a controlled manner when the bait is being used.
10. Its capacity of contraction-swelling/expansion is reversible, permitting its storage in the dry, prolonging in this way its useful lifetime, as well as the successive incorporation of diverse additives and attractants.
11. Its collagenous proteic nature makes it totally digestible for the fish that might eat it, 100% biodegradable in the short term and as such environmentally friendly or ecological.
12. Its proteic nature also permits the incorporation, through the use of crosslinking agents, of diverse attractant molecules added to the collagenous emulsion, that remain chemically fixed to the fibrous matrix, permanently modifying its structure and its organoleptic qualities.
13. Its buoyancy can be controlled, through the presence or absence of air in the mass, or the incorporation of solutions of densities other than 1.

The examples that are described below serve to illustrate the invention, without implying any limitations to the possibilities for its use or manufacture.

EXAMPLE 1

An aqueous dispersion of fibrous collagen reconstituted, obtained from bovine hides by the methods described in the section "Preparation of the precursor paste", is adjusted to a pH of 3.0 to provoke its maximum swelling by hydration of the collagen. It is then submitted to a process of grinding in a colloidal mill and mechanical removal of the fibres until a homogeneous concentrated collagen paste is obtained (composition A).

EXAMPLE 2

Starting from composition A obtained as described in example 1, a quantity of glycerol is incorporated into the paste as a plasticiser, equivalent to 12% of the dry weight of the collagen. To the resulting paste, a coloured additive suitable for use in foodstuffs is added, such as the carmine (E120) (Sancolour S. A., Barcelona, España), a quantity equivalent to 1% by weight of the dry weight of the collagen; a preservative such as potassium sorbate (E202) in an quantity equivalent to 3% by weight of the dry weight of the collagen, and a lubricant such as the oil Durkex 500 (Loders Croklaan, Wormeveer, Holanda) at 5% by weight of the dry weight of the collagen. The resulting precursor paste (2) is mixed with a solution of 50% pure 1,5-pentadial (BASF AG Imhof und Stahl GmbH Manheim, Alemania) in sufficient quantity such that the 1,5-pentadial reaches 1.25% of the dry weight of the collagen, with the object of forming a gel out of the collagen mix. The collagen content of the paste is adjusted by dilution in water, until reaching 10% of the total weight of the hydrated paste (composition B). The dilution process is carried out in a vacuum to eliminate the air in the mass and reduce its buoyancy. The composition of the precursor paste is presented in Table I. Immediately afterwards the paste is extruded through circular orifice of 5.5 mm in cross-section in order to obtain a wormlike cylinder, now coagulated, of a fleshy aspect, shiny and extremely flexible. The gelatinous cord or worm of fibrous collagen is cut up into segments of some 20 cm. These worms are manually hooked onto RAPALA series VMC hooks in order to test the ease of their manipulation as well as their hold on the hooks. The flexibility and cohesion of the worms enables their correct positioning and a good hold on the hook to be achieved (Box I). In order to make a subjective estimation of the flexibility and the capacity of the worm to support stress without breaking, the manipulation of bending-doubling it through 180° is evaluated with a radius of curvature equal to the diameter of the section of the worm.

The reconstituted fibrous collagen worms, obtained according to the current example, have been subsequently submitted through two types of physico-mechanical tests: texturometry and strengh to traction. The assays of texture were carried out using a texturometer Stable Micro Systems TA-XT2i and were centred in an aspect that was considered important in a bait of the desired characteristics, such as the bite.

In the test of the fibres, the measurement aims to determine the strengh of the bait to the bite, to determine the maximum force of compression necessary to section a cylindrical colbait worm such as that extruded in the present example. The measurements are determined using a set of blades in a guillotine HDP/BSG at a velocity of 2 mm/s placed at a distance of 30 mm.

In terms of the measurement of the tensile strengh, this gave us an idea of the strengh of the bait to trawling and to the pull produced during the hooking of the fish. In order to carry out these assays dynamometers were selected Kern & Sons GMBH Pesola, (Balingen, Alemania). The measure gave us the maximum traction force necessary to break a colbait worm extracted through a 5,5 mm diameter orifice. The worm was passed through a ring of the dynamometer and it was stretched at both ends until it broke.

The results obtained are presented in Box I.

TABLE I

| Composition of the precursor paste (2) | % weight |
| --- | --- |
| Dry Collagen | 10 |
| Glycerol (on dry collagen) | 12 |
| Carmine (on dry collagen) | 1 |
| Potassium Sorbate (on dry collagen) | 3 |
| 1,5-pentadial (on dry collagen) | 1.25 |
| Durkex 500 Oil (on dry collagen) | 5 |

Box I
Physico-mechanical tests

| | Fibres (g) | Tensile strengh (g) | Hooking | Flexibility |
| --- | --- | --- | --- | --- |
| Worm 1 | 2.270 | 1.450 | 3 | 3 |

Evaluation of the manipulation (scale 1-3)*
*1 = poor; 2 = good; 3 = very good;

The worms were finally packaged in ZIP bags, 20 units per bag, to which some drops of Worm Oil (commercialised by Lurecrafts) were added. The bags were stored at a temperature between 2 and 5° C. for 9 months and opened at the end of this period, when it was noted that the baits had been conserved in a perfect state.

EXAMPLE 3

Starting from the paste from the Example 1 (composition A), materials are subsequently incorporated into this paste such as strengthening agents, a quantity of cellulose equivalent to 15% of the dryweightof the collagen, and 15% byweight of glycerol of the dry weight of the collagen. Further additives were included: colorants such as the caramel (E 150a) at 8% of the dry weight of the collagen in C; the preservative Sodium Benzoate (5% p/p), Durkex 500 oil (8% p/p), and the aroma of marine worms (extract of Nereis sp. 6,85% by weight of dry collagen). Prior to the extrusion, a crosslinking substance such as formaldehyde (37% solution, Brenntag Chemiepartner GmbH, Heilbronn, Alemania) was added to a concentration of 18,4% of the dry weight of the collagen. Finally the paste was diluted to adjust the collagen content to 7,3% by weight of the total weight of the mixture (composition C). The dilution was performed in a vacuum in order to eliminate the air from the mass and decrease its buoyancy. Immediately after, the precursor paste (3) was extruded through a circular orifice of 5,5 mm diameter, obtaining a continuous cylindrical worm, with a consistent and fleshy aspect, moist, with a smooth and shiny surface, extremely flexible.

The worms obtained were submitted to diverse mechanical tests of the fibres and tensile strengh, employing the texturometer Stable MIcroSystems TA-XT2i and the dynamometers Kern & Sons GMBH, with the same equipment and parameters presented in example 2 and in Box II.

Hence, the same worms were submitted to the corresponding operations of hooking with type RAPALA VMC hooks, where they showed an excellent behaviour both in the ease of the operation such as in the hold on the hook (Box II).

TABLE II

| Composition of the Precursor Paste (3) | % weight |
| --- | --- |
| Dry Collagen | 7.3 |
| Cellulose (on dry collagen) | 15.0 |
| Glycerol (on dry collagen) | 15.0 |
| *Nereis* sp Extract (on dry collagen) | 6.85 |
| Caramel (on dry collagen) | 8.0 |
| Sodium Benzoate (on dry collagen) | 5.0 |
| Durkex 500 Oil (on dry collagen) | 8.0 |
| Formaldehyde (on dry collagen) | 18.4 |

Box II

| | Fibres (g) | Tensile strength (g) | Hooking | Flexibility |
| --- | --- | --- | --- | --- |
| Worm 2 | 1.888 | 1.450 | 3 | 3 |

Evaluation of the manipulation (scale 1-3)*
*1 = poor; 2 = good; 3 = very good;

The worms were finally packaged in ZIP bags, 20 units per bag, to which some drops of Worm Oil (were added. The bags were stored at a temperature between 2 and 5° C. for 9 months and opened at the end of this period, when it was noted that the baits had conserved in a perfect state.

EXAMPLE 4

The precursor paste (4), elaborated following the process in Example 3 except for the scent, that in the actual case was an aroma of squid (Catalana Brasileira Cial., S. L. 08400 Granollers, Barcelona, España), and in the colorant to which 1,5% of carmine was also added; it was submitted to a process of injection molding in a mold. Previously, in order to facilitate the operation of injecting into the mold, the paste was submitted to a process of homogenisation. In this case a mold was constructed out of epoxy resin, whose cavity accommodated a design of 180 mm in length and 76 cm$^3$ volume, corresponding to the figure of a squid (FIG. 1). In parallel, starting from a monofilamentous reel of cured collagen made by Costring (Naturin GMBH, Alemania) a net was woven in the form of cylindrical casing of the dimensions of the interior cavity of the "hood of the squid" (the part of the body that excludes the head and tentacles). This net was placed and held in the interior of the cavity of the mold. The precursor paste was injected under pressure into the mold, where it remained for a period of 4 hours, after which the mold was opened and the resulting figure was removed from the mold. The gelatinous collagen squid obtained has a solid consistency, was very flexible and fleshy, with a shiny surface and a moist aspect that together gave it a very real appearance. The tensile strengh of the squid enabled it to be used as a lure for trolling lure fishing (dragging the lure behind a motor boat) at a velocity of 4 knots, without any disruption of the lure being observed.

EXAMPLE 5

Starting from the concentrated paste from example 1 (composition A), materials are subsequently incorporated into the mixture, such as: strengthening materials, a quantity of cellulose equivalent to 15% of the dry weight of collagen in composition C; and such as plasticisers, 15% by weight of glycerol of the dry weight of the collagen in composition C. The paste is given its colour by incorporating carmine red (E 120) that is added in a quantity equivalent to 1.5% of the dry weight of the collagen. Finally, the paste is diluted until the collagen content is adjusted to 7.3% by weight of the total weight of the mixture (composition C). The dilution process is carried out in a vacuum in order to eliminate the air in the mass and decrease its buoyancy. The content of the precursor paste (5) is presented in Table II. Subsequently, the paste is extruded through a circular 5,5 mm diameter hole such that the extrusion headstock is situated above a tray containing a bath solution of 25% aqueous ammonium hydroxide. The continuous cord of gel coagulated is collected by a external rotating roller whose rotary speed is controlled, and it is submerged into a wash tray containing circulating water in order to eliminate the rest of residual ammonia. The cord is then taken up by a new extraction roller and deposited on a Teflon transportation belt where is cut into worm-like segments of 200 mm in length.

The worms obtained are of a consistent and fleshy aspect, moist, with a smooth and shiny surface, and extremely flexible. They were submitted to the corresponding manipulations of hooking with RAPALA VMC type hooks, where their excellent behaviour was demonstrated both in the ease of the operation as in the hold on the hook (Box II).

Subsequently, the worms obtained were submitted to diverse mechanical tests their fibres and tensile strengh, using a Stable MIcroSystems TA-XT2i texturometer and the dynamometers Kern & Sons GMBH, with the same equipment and parameters presented example 2 and the results are shown in Box III.

TABLE III

| Composition of the precursor paste (5) | % weight |
| --- | --- |
| Dry Collagen | 7.3 |
| Cellulose (on dry collagen) | 15.0 |
| Glycerol (on dry collagen) | 15.0 |
| Carmine red (on dry collagen) | 1.5 |
| Coagulation Bath | Sol.NH$_4$(OH)25.0% |

Box III

| | Fibres (g) | Tensile strengh (g) | Hooking | Flexibility |
| --- | --- | --- | --- | --- |
| Worm 3 | 1.354 | 600 | 3 | 3 |

Evaluation of the manipulation (scale 1-3)*
*1 = poor; 2 = good; 3 = very good;

EXAMPLE 6

In this variant starting from the paste in Example 1 (Composition A) and another fibrous collagen composition made up in this case of collagen of porcine origin that has been elaborated according to the procedure developed in the section of "Preparation of the precursor paste" starting from fresh pig intestines (composition D), and in which the aqueous dispersion of fibrous collagen from which the fat has been removed in the process is adjusted to a pH of 3.0 in order to provoke its maximum swelling due to hydration of the collagen, it is ground in a colloidal mill and the fibres mechanical removed until a homogeneous paste of concentrated collagen is obtained.

The concentrated composition A and B are mixed in the necessary proportions in order to obtain a ratio of bovine to porcine collagen that is around 2:1. Subsequently, glycerol is incorporated into the paste at 8% byweightof the total dryweight of the collagen in the mix, as well as iron oxide as a red colorant (E172) at 2.5% of the total weight of collagen, and a preservative methyl p-hydroxybenzoate (E218) at 5% of the total dryweight of the collagen in the mix, obtaining the precursor composition (6) with the content presented in Table IV. Finally, the mix is diluted until the total collagen content is situated around 7.2% by weight of the total weight of the hydrated paste.

Then, the paste is extruded through a circular orifice of 5,5 mm diameter in such a way that the extrusion headstock is situated above the interior of a coagulation chamber with an atmosphere of ammonia. The continuous coagulated gel cord collected by a external rotary roller whose speed of rotation is controlled, and it is submerged in a wash tray containing circulating water in order to eliminate the residual ammonia that is left. The cord is dragged along by another roller to extract it, and deposited on a Teflon transportation belt where it is cut into wormlike segments of 200 mm in length.

The worms obtained are of a consistent and fleshy aspect, moist, with a smooth and shiny surface, and extremely flexible. They were submitted to the corresponding manipulations of hooking with RAPALA VMC type hooks, where their excellent behaviour was demonstrated both in the ease of the operation as in the hold on the hook (Box IV).

Subsequently, the worms obtained were submitted to diverse mechanical tests to test their fibres and their tensile strengh using a Stable MIcroSystems TA-XT2i texturometer and the dynamometers Kern & Sons GMBH, with the same equipment and parameters presented example 2 and the results are shown in Box IV.

TABLE IV

| Composition of the precursor paste (6) | % weight |
| --- | --- |
| Dry Bovine Collagen | 4.8 |
| Dry Porcine Collagen | 2.4 |
| Total Dry Collagen | 7.20 |
| 1,5-pentadial (on dry collagen) | 8.65 |
| Glycerol (on dry collagen) | 8.0 |
| Iron oxide (on dry collagen) | 2.5 |
| Methyl p-hydroxybenzoate | 5.0 |
| Coagulation Atmosphere | NH$_3$ gas |

Box IV

| | Fibres (g) | Tensile strengh (g) | Hooking | Flexibility |
| --- | --- | --- | --- | --- |
| Worm 4 | 1.959 | 1.250 | 3 | 3 |

Evaluation of the manipulation (scale 1-3)*
*1 = poor; 2 = good; 3 = very good;

EXAMPLE 7

Figure 2:
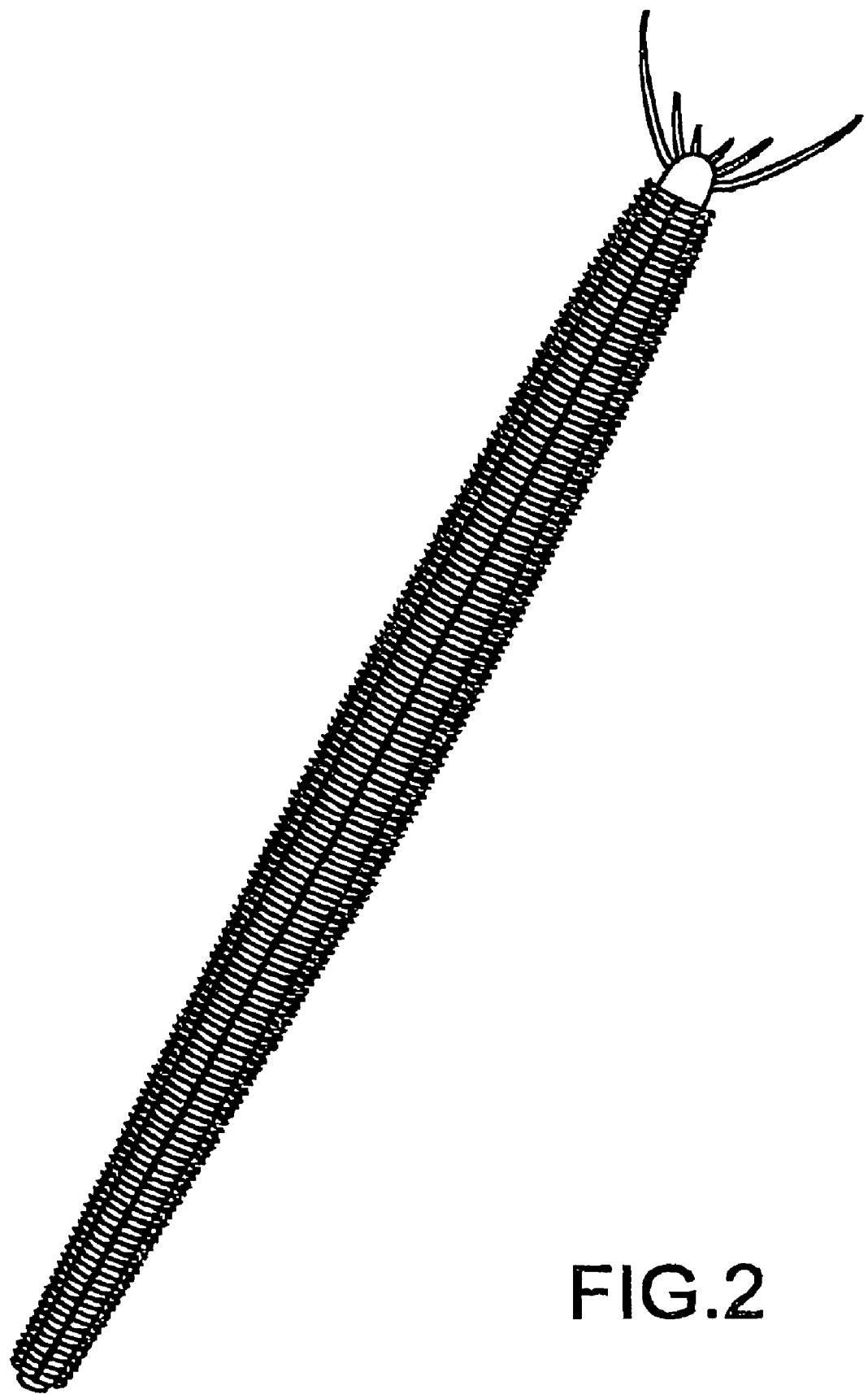
FIG. 2 illustrates a universal fishing bait comprised fundamentally of a matrix of fibrous collagen in the shape of a marine polychaete worm, obtained by injection molding.

The precursor paste (6) was elaborated according to the procedure in Example 6 except that additionally, the aroma of worm extract (*Nereis* sp.) was added in a quantity equivalent to 6.5% by weight of the dry weight of the collagen. The paste was submitted to a process in which the air was removed, homogenised and then injection molding. Previously, a 37% (by weight) solution of formaldehyde was also added to the paste until it reached a concentration of 6.2% with respect to the weight of the dry collagen, without producing hardly any change in the percentage composition of the solids in the precursor paste (6), giving rise to the new precursor paste (7). In order to perform the injection a two-piece mold was made up of epoxy resin in whose cavity a design of 270 mm in length and 16 cm³ volume could be housed, corresponding to the figure of a polychaete marine worm (FIG. 2). The paste was injected under pressure into the mold where it remained for a period of 4 hours, after which the mold was opened and the figure removed. The coagulated collagen worm obtained had a solid very flexible and fleshy consistency, with a shiny surface, a moist aspect, which together gave it a very real appearance. The worms obtained were submitted to the corresponding hooking manipulations with RAPALA VMC type hooks, where an excellent behaviour both in terms of the ease of the manipulation and the hold on the hook were observed.

EXAMPLE 8

Starting with the composition A obtained as in example 1, a 2.6% aqueous solution of glucomannan is subsequently incorporated into the paste (Nutricol GP 6220, FMC Biopolymer, FMC Corporation, Philadelphia, USA), such that the quantity of glucomannan is adjusted to 5.0% by weight of the dry weight of collagen. Similarly, a quantity of glycerol is incorporated as a plasticiser equivalent to 12% of the dry weight of collagen. The resulting paste is kneaded and mixed with other additives such as colorants (carmine red at 0.5% of the dry weight of collagen; Glitter at 1.5% of the dry weight of the collagen), preservatives (sodium benzoate, E211) at 5% of the weight of the collagen, and a lubricant (Dynasan 118 oil at 5% of the dry weight of the collagen). Finally, the collagen content of the paste is adjusted by diluting in water until a value of 11.5% by weight of the total weight of the hydrated paste is reached (composition E). The resulting composition is laid out in Table V. Before being submitted to extrusion, the paste was mixed with a solution containing a crosslinking agent (37% formol) until reaching a concentration of the aldehyde of 3.9% of the dry collagen.

The precursor paste (8) obtained in this way is extruded through a 5.5 mm diameter circular orifice, producing a continuous worm of fleshy texture and consistency, with a shiny and reflective aspect, that is extremely flexible, easy to manipulate and hook on a RAPALA VMC hook commonly used in order to the fish black bass. An excellent behaviour, both in the ease of the manipulating the bait to hook it, and its hold on the hook, was observed (Box V).

Subsequently, the worms obtained were submitted to diverse assays of texturometry and traction, with the equipment and conditions laid out in example 2, and the results of which are shown in the Box V.

TABLE V

| Composition of the precursor paste (8) | % weight |
|---|---|
| Dry Collagen | 11.5 |
| Glucomannan (on dry collagen) | 5.0 |
| Glycerol (on dry collagen) | 12.0 |
| Carmine Red (on dry collagen) | 0.5 |
| Glitters (on dry collagen) | 1.5 |
| Sodium Benzoate (on dry collagen) | 5.0 |
| Dynasan 118 oil (on dry collagen) | 5.0 |
| Formaldehyde (on dry collagen) | 3.9 |

Box V

| | Fibres (g) | Tensile strength (g) | Hooking | Flexibility |
|---|---|---|---|---|
| Worm 5 | 1.373 | 900 | 3 | 3 |

Evaluation of the manipulation (scale 1-3)*
*1 = poor; 2 = good; 3 = very good;

EXAMPLE 9

Starting with the concentrated paste (composition A) from example 1, additives were subsequently incorporated into the paste such as strengthening agents, a quantity of cellulose equivalent to 15% of the dry weight of the collagen in composition C and 15% by weight of glycerol of the dry weight of collagen in composition C. Colour is added to the paste with carmine red (E 120), added in a quantity equivalent to 1.5% of the dry weight of the collagen. Afterwards, the paste is scented with a worm extract from *Nereis* sp. in a quantity of 6.85% by weight of the dry weight of the collagen. Finally, the paste is diluted until the collagen content is adjusted to 7.3% by weight of the total weight of the collagen (composition C). The content of the precursor paste (9) obtained in this way is laid out in Table VI.

Then, the paste is extruded through a 5.5 mm diameter circular orifice in such a way that the headstock of extrusion is situated above a tray containing a bath of saturated NaCl solution. The continuous cord of coagulated gel is collected onto an external rotary roller whose speed of rotation is controlled, and submerged into a wash tray containing circulating water in order to eliminate the excess residual saline solution. The cord is dragged by a new extractor roller and deposited on Teflon transportation belt where is cut into worm-like segments of 200 mm in length.

The worms obtained are of a consistent and fleshy aspect, moist, with a smooth and shiny surface, and extremely flexible were submitted to the corresponding manipulations of hooking, with RAPALA VMC type hooks, where their excellent behaviour was demonstrated both in the ease of the operation as in the hold on the hook (Box VI).

Subsequently, the worms obtained were submitted to diverse mechanical tests to test their fibres and tensile strengh, using a Stable MIcroSystems TA-XT2i texturometer and the dynamometers Kern & Sons GMBH, with the same equipment and parameters presented example 2 and the results are shown in Box VI.

TABLE VI

| Composition of the precursor paste (9) | % weight |
|---|---|
| Dry Collagen | 7.3 |
| Cellulose (on dry collagen) | 15.0 |
| Glycerol (on dry collagen) | 15.0 |

TABLE VI-continued

| | | Carmine Red (on dry collagen) | | 1.5 | |
| | | Nereis sp. Extract (on dry collagen) | | 6.85 | |
| | | Coagulation Bath | | Saturated NaCl Sol. | |

Box VI

| | Fibres (g) | Tensile strength (g) | Hooking | Flexibility |
|---|---|---|---|---|
| Worm 5 | 3.060 | 1.250 | 3 | 3 |

Evaluation of the manipulation (scale 13)*
*1 = poor; 2 = good; 3 = very good;

Finally, the worms destined for marine sports fishing were sealed in glass bottles containing brine and 5% of sodium benzoate in order to maintain their perfect state of conservation until their use.

EXAMPLE 10

Starting with the composition A obtained according to the example 1, additives were subsequently incorporated into the paste such as an aqueous solution of gum guar (5000 CPS Sigma Chemical Co., P.O. Box 14508, St. Louis, Mo. 63178 USA) in such a manner that the quantity of gum guar was adjusted to 5.0% by weight of the dry weight of collagen. As a plasticiser, a quantity of glycerol was added equivalent to 12% of the dry weight of collagen. The resulting paste was kneaded and mixed with diverse colorants (carmine red at 0.5% of the dry weight of collagen; Glitters at 1.5% of the dry weight of the collagen). Finally, the collagen content was adjusted by diluting in water until a value that corresponds to 11.5% by weight of the total weight of the hydrated paste is reached (composition E). The composition of the precursor paste (10) in this way obtained is set out in Table VII. Before being submitted to extrusion, the paste was mixed with a solution of a crosslinking agent (37% formol) until an aldehyde concentration of 3.9% of the dry collagen is reached.

The precursor paste (10) thus obtained is extruded through a 5.5 mm diameter circular orifice generating a continuous worm of fleshy texture, of a consistent shiny aspect, extremely flexible, easy to manipulate and hook on a RAPALA VMC hook commonly used in order to fish black bass. An excellent behaviour both in the ease of the manipulation as in the hold on the hook was observed (Box VII).

Subsequently, the worms obtained were submitted to diverse texturometry and traction assays with the same equipment and parameters presented example 2 and the results are shown in Box VII.

TABLE VII

| Composition of the precursor paste (10 | % weight |
|---|---|
| Dry Collagen | 11.5 |
| Gum guar (on dry collagen) | 5.0 |
| Glycerol (on dry collagen) | 12.0 |
| Carmine Red (on dry collagen) | 0.5 |
| Glitters (on dry collagen) | 1.5 |
| Formaldehyde (on dry collagen) | 3.9 |

Box VII

| | Fibres (g) | Tensile strength (g) | Hooking | Flexibility |
|---|---|---|---|---|
| Worm 7 | 2.077 | 1.250 | 3 | 3 |

Evaluation of the manipulation (scale 1-3)*
*1 = poor; 2 = good; 3 = very good;

EXAMPLE 11

Starting with the composition A obtained according to the procedure in example 1, additives were subsequently incorporated to the paste such as a dispersion of milk proteins (Casein 29, Horst-Jürgen Wengenroth, Rissener Landsafterse 121 D-22587 Hamburg, Alemania) in such a way that the quantity of casein was adjusted to 20.0% by weight of the dry weight of the collagen. As a plasticiser a quantity of glycerol was added equivalent to 6.0% of the dry weight of the collagen. Finally, the collagen content is adjusted by diluting in water until a value of 12.0% by weight of the total weight of the hydrated paste is reached (composition F). The composition of the precursor paste (11) so obtained is laid out in Table VIII. Before being submitted to extrusion, the paste was mixed with a solution of a crosslinking agent (37% formol) until an aldehyde concentration of 8.4% of the dry collagen is reached.

The precursor paste (10) thus obtained is extruded through a 5.5 mm diameter circular orifice generating a continuous worm of fleshy texture, of a consistent shiny aspect, extremely flexible, easy to manipulate and hook on a RAPALA VMC hook commonly used in order to fish black bass. An excellent behaviour both in the ease of the manipulation as in the hold on the hook was observed (Box VIII).

Subsequently, the worms were submitted to diverse texturometry and traction assays with the same equipment and parameters presented example 2 and the results are shown in Box VIII.

TABLE VIII

| Composition of the precursor paste (11) | % weight |
|---|---|
| Dry Collagen | 12.0 |
| Casein (on dry collagen) | 20.00 |
| Glycerol (on dry collagen) | 6.0 |
| Formaldehyde (on dry collagen) | 8.4 |

Box VIII

| | Fibres (g) | Tensile strength (g) | Hooking | Flexibility |
|---|---|---|---|---|
| Worm 8 | 3.428 | 2.450 | 3 | 3 |

Evaluation of the manipulation (scale 1-3)*
*1 = poor; 2 = good; 3 = very good;

EXAMPLE 12

Starting with the precursor paste (9) from example 9, the paste is subsequently extruded through a 5.5 mm diameter circular orifice where the extrusion headstock is situated above a tray containing a bath solution of saturated NaCl. From an independent tubular duct that opens into the interior of the headstock and whose end is positioned at the centre of the orifice where the paste exits, exactly in its centre, a monofilament of cured collagen is fed into the mix (Costring of the firma Naturin GMBH, Weinheim, Alemania), which comes from a reel exterior to the headstock. The cross-section of the monofilament is equivalent to the interior diameter of the duct from which it is fed. The continuous string of coagulated gel that is extruded through the headstock drags the filament with it along its longitudinal axis, and is collected by a external rotary roller whose speed of rotation is controlled and it is submerged in a wash tray containing circulating water in order to eliminate the excess of residual saline solution. The cord is dragged by another roller, extracted and deposited on a teflon transportation belt where it is cut into worm-like segments of 200 mm in length.

The worms obtained are of a consistent and fleshy aspect, moist, with a smooth and shiny surface, and extremely flexible. They possess a central nucleus of high tensile strengh and subsequently, they were submitted to the corresponding manipulations of hooking, with RAPALAVMC type hooks, where their excellent behaviour was demonstrated both in the ease of the operation as in the hold on the hook.

Finally, the worms destined for marine sports fishing were sealed in glass bottles containing brine and 5% of sodium benzoate in order to maintain their perfect state of conservation until their use.

EXAMPLE 13

In this variant of the manufacture of the collagen lure, the aim is to coat a metal element that as well as providing the lure with more weight, serves to carry the hook, both being integrated into the lure. For this, we started with a solid and fusiform lead body that has been previously melted onto a Rapala VMC type hook in the proximal and central thirds such that the two ends deliberately remain free. The proximal end that has remained free is the where a ring is situated through which the fishing line can be threaded. The distal third is curved and carries a small harpoon that is free at, the curved part. An injection mold is constructed of epoxy resin and aluminium that is made up of two pieces as in anterior cases, housing a cavity in the shape of a fish whose body is also fusiform but slightly larger than the lead matrix. Between the two halves of the mold, tubular cavities exist that house the portions of the hook that must remain free of the collagen coating, the little harpoon lying on the ventral side and the ring on the dorsal part of the fish.

Starting with the composition of precursor paste 3 in example 3, in which the worm extract has been substituted by the same quantity of fish extract, and in which the colorant has been substituted for a mix of iron oxide (E172) and titanium dioxide (E171). In this way the precursor paste (12) obtained prior to homogenisation was used for injection molding described in this current example. Following injection, the figure was removed from the mold after a period of 4 hours, in this way obtaining a little collagen fish, very real, very heavy and carrying a hook whose curved portion is exterior to the ventral region of the fish lure. The ring portion of the hook also remains free in the dorsal region of the fish.

EXAMPLE 14

Starting with the composition A obtained according to the process in example 1, a dispersion of milk protein is subsequently incorporated into the paste (Casein 29, Horst-Jürgen Wengenroth, Rissener Landsafterse 121 D-22587 Hamburg, Alemania) in such a way that the quantity of casein is adjusted to 20.0% by weight of the dry weight of the collagen. As plasticisers, a quantity of glycerol is added equivalent to 6.0% of the dry weight of the collagen. In order to increase the buoyancy of the bait, an amount of fat is added to the paste (fish oil, Denmark) equivalent to 20% by weight of the dry weight of the collagen. Finally, the collagen content is adjusted by dilution in water until it reaches a value of 12.0% by weight of the total weight of the hydrated paste (composition G). The composition of the paste precursor (13) obtained in this manner is shown in Table IX. Before being submitted to extrusion, the paste was mixed with a solution of a crosslinking agent (37% formol) until an aldehyde concentration of 8.4% of the dry collagen is reached.

The precursor paste (13) obtained in this way was extruded through a 5.5 mm diameter circular orifice generating a continuous worm with a fleshy texture and consistency, a shiny aspect that is extremely flexible, easy to manipulate and that was cut into 5 mm segments, generating in this way small chunks or "pellets" that were subsequently used in order to fish with a rod for small species of fish that are then used as bait in order to catch other larger sporting fish.

TABLE IX

| Composition of the precursor paste (13) | % weight |
|---|---|
| Dry Collagen | 12.0 |
| Casein (on dry collagen) | 20.0 |
| Glycerol (on dry collagen) | 6.0 |
| Fish Oil (on dry collagen) | 20.0 |
| Formaldehyde (on dry collagen) | 8.4 |

EXAMPLE 15

Starting with the composition A obtained according to the process in example 1, an aqueous solution of gum guar is subsequently incorporated into the paste (5000 CPS Sigma Chemical Co., P.O. Box 14508, St. Louis, Mo. 63178 USA) in such a way that the quantity of gum guar is adjusted to 5.0% by weight of the dry weight of the collagen. As a plasticiser, a quantity of glycerol is added equivalent to 12% of the dry weight of the collagen. The resulting paste is kneaded and mixed with the colorant carmine red at 0.5% of the dry weight of the collagen. Finally, the collagen content is adjusted by dilution in water until a value of 11.5% by weight of the total weight of the hydrated paste is reached (composition H). The composition of the precursor paste (15) obtained in this way is shown in Table X. Just before performing the extrusion, the paste was mixed with a solution of a crosslinking agent (37% formol) until it reached a concentration of aldehyde of 3.9% of the dry collagen.

The precursor paste (14) obtained in this manner was co-extruded along with an aqueous dispersion of sodium alginate of 3% by weight, 0.5% by weight of glitter, and Nereis sp. extract of 5% by weight, through the extrusion headstock with a circular orifice of 12 mm central diameter through which the fibrous precursor paste flows and which is surrounded by a concentric grooved ring 500 microns thick through which the emulsion of sodium alginate flows at a controlled speed, mixed with the shiny particles. At the exit from the extrusion outlet there is a bath solution of saturated calcium chloride that provokes the instantaneous coagulation of the external alginate membrane. In this way a continuous worm is generated, formed of a fibrous body covered with a fine transparent skin that together possesses a smooth and fleshy texture and consistency with a moist aspect, glossy and shiny, extremely flexible, easy to manipulate and hook on a RAPALA VMC hook commonly used in order to fish black bass. An excellent behaviour both in the ease of manipulation and in the hold on the hook is observed.

TABLE X

| | % weight |
|---|---|
| Composition of the precursor paste (14) | |
| Dry Collagen | 11.5 |
| Gum Guar (on dry collagen) | 5.0 |
| Glicerol (on dry collagen) | 12.0 |
| Carmine Red (on dry collagen) | 0.5 |
| Formaldehyde (on dry collagen) | 3.9 |

TABLE X-continued

| | % weight |
|---|---|
| Composition of the precursor paste base of Alginate | |
| Sodium Alginate | 3.0 |
| Glitter (of the weight of Alginate) | 0.5 |
| *Nereis* sp. Extract (of the weight of Alginate) | 5.0 |

What is claimed is:

1. Universal fishing bait comprising a matrix of natural fibrous collagen that has been extracted from animal tissue and is configured into any shape or design capable of attracting fish, the bait being a soft bait that is comprised of between 1 to 30% by weight of fibrous collagen with respect to the total wet weight of the matrix.

2. Bait according to claim 1, wherein the fibres of collagen of the matrix are orientated in one or various direction in order to improve the tensile strength in said directions.

3. Bait according to claim 1, wherein the fibrous collagen matrix coats a substrate made up into any shape or design capable of attracting the fish.

4. Bait according to claim 1, wherein the fibrous collagen comes from any animal source and can be native, partially hydrolysed, or chemically modified.

5. Bait according to claim 1, wherein the collagen has the capacity to be hydrated and dehydrated in a reversible manner.

6. Bait according to claim 1, comprising a soft bait that is comprised of between 2 to 20% by weight of fibrous collagen with respect to the total wet weight of the matrix.

7. Bait according to claim 1, wherein as well as the fibrous collagen, the matrix comprises one or various attractant substances.

8. Bait according to claim 7, wherein the attractant substances are selected from the group consisting of: blood proteins from vertebrate animals and invertebrates, L-amino acids, nucleotides, nucleosides, alcohol's, sugars, fats, meat extracts, fish extracts, and aquatic organisms extracts.

9. Bait according to claim 7, wherein the attractant substances are incorporated into the bait during its conformation through the mixing of such attractant substances with an aqueous dispersion of fibrous collagen in order to prepare the precursor paste from which the matrix of fibrous collagen is derived.

10. Bait according to claim 7, wherein the attractant substances are incorporated into the bait after the conformation of the bait by impregnation.

11. Bait according to claim 7, wherein the attractant substances are chemically crosslinked to the collagen molecules through the action of crosslinking agents.

12. Universal fishing bait comprising:
a matrix of fibrous collagen configured into any shape or design capable of attracting fish; and
one or more additives selected from the group consisting of: crosslinking agents; other non-collagenous proteins; strengtheners; gelling agents; plasticising agents; lubricants; colorants; preservatives and antioxidants; and agents that modify the density;
the non-collagenous proteins are selected from the group consisting of: keratin, elastin, milk serum, casein, albumin, fibrin, actin, myosin, wheat gluten, zeine and globulins from leguminous seeds.

13. Bait according to claim 12, wherein the dry weight of the total protein, collagenous and non-collagenous, is greater than 50% of the total dry weight of the mixture.

14. Bait according to claim 12, wherein the crosslinking agents are selected from the group consisting of: aldehydes; sugars; modified starches; aliphatic di-isocyanates; hexamethylene di-isocyanate; polyethyleneglycol diglycydol ether; metal cations; oils; fats; tanning protein enzymes; diepoxides; and modified resins of melamine.

15. Bait according to claim 12, wherein the strengtheners are selected from the group consisting of: fibres of cellulose; polysaccharides derived from chitin; polymers of n-acetylglucosamine; polymers of chitosan; starches; dialdehyde starch; synthetic resins; hydrolysed poly-vynil-alcohol (PVA); water soluble esterified polysaccharides; propylene glycol alginate (PGA); vegetable fibres; cotton; flax; hemp; and abaca.

16. Bait according to claim 12, wherein the gelling agents are selected from the group consisting of: cellulose ethers, carboxymethyl cellulose, hydroxymethyl cellulose, hydroxypropyl cellulose, hydroxypropylmethyl cellulose; hydrocolloids, alginates, carrageenans, agar, furcellerans, chitosan, guar gum, locust bean/garrofin gum, gum arabic, gum tragacanth, gum karaya, gum gellan, xanthan gum, pectins, glucomannans, honey with promoters of gelling selected from the group of metal salts of the group IA, beryllium, calcium or strontium, of group IIB, zinc, cadmium, of group IIIA, and aluminium.

17. Bait according to claim 12, wherein the plasticising agents are selected from the group consisting of: polyhydric alcohols, glycerol, sorbitol, sorbitan, mannitol, maltitol, propylene-glycol, ethylene-glycol, Panthenol, propylene glycol-alginate, polymeric sugars, saccharose, and maltose.

18. Bait according to claim 12, wherein the lubricants are selected from the group consisting of: fats; mono- di- and tri-esters of the edible polyhydric alcohols; vegetable oils; mineral oils; edible fatty acids; phospholipids, lecithin; silicon oil and mucopolysaccharides.

19. Bait according to claim 12, wherein the colorants are selected from the group consisting of: organic or inorganic colorants, natural or artificial, and annato, iron and titanium oxides, cochineal carmine, squid ink, caramel, glitter, indigo, chlorophyll's, anthocyanin's, carotenes, turmeric and vegetable carbon.

20. Bait according to claim 12, wherein the preservatives and antioxidants are selected from the group consisting of: ascorbic acid, ascorbyl palmitate, sodium bisulphate, calcium propionate, sorbic acid, potassium sorbate, butylated hydroxyanisole (BHA), butylated hydroxytoluene (BHT), ethoxyquin, lactic acid, acetic acid, benzoic acid, sodium benzoate, ethyl-o-hydroxybenzoate, methyl-p-hydroxybenzoate, propyl-p-hydroxybenzoate, spices and vegetable extracts.

21. Bait according to claim 12, wherein the agents to modify the density are selected from the group consisting of: substances with a density less than 1 and solutions with a density greater than 1.

22. Bait according to claim 21, wherein the substances with a density less than 1 are fats and oils.

23. Bait according to claim 21, wherein the substances with density greater than 1 are molasses.

* * * * *